Jan. 26, 1937.  J. C. DIEHL  2,068,663
INDICATOR FOR FLUID VARIABLES
Filed Jan. 3, 1931
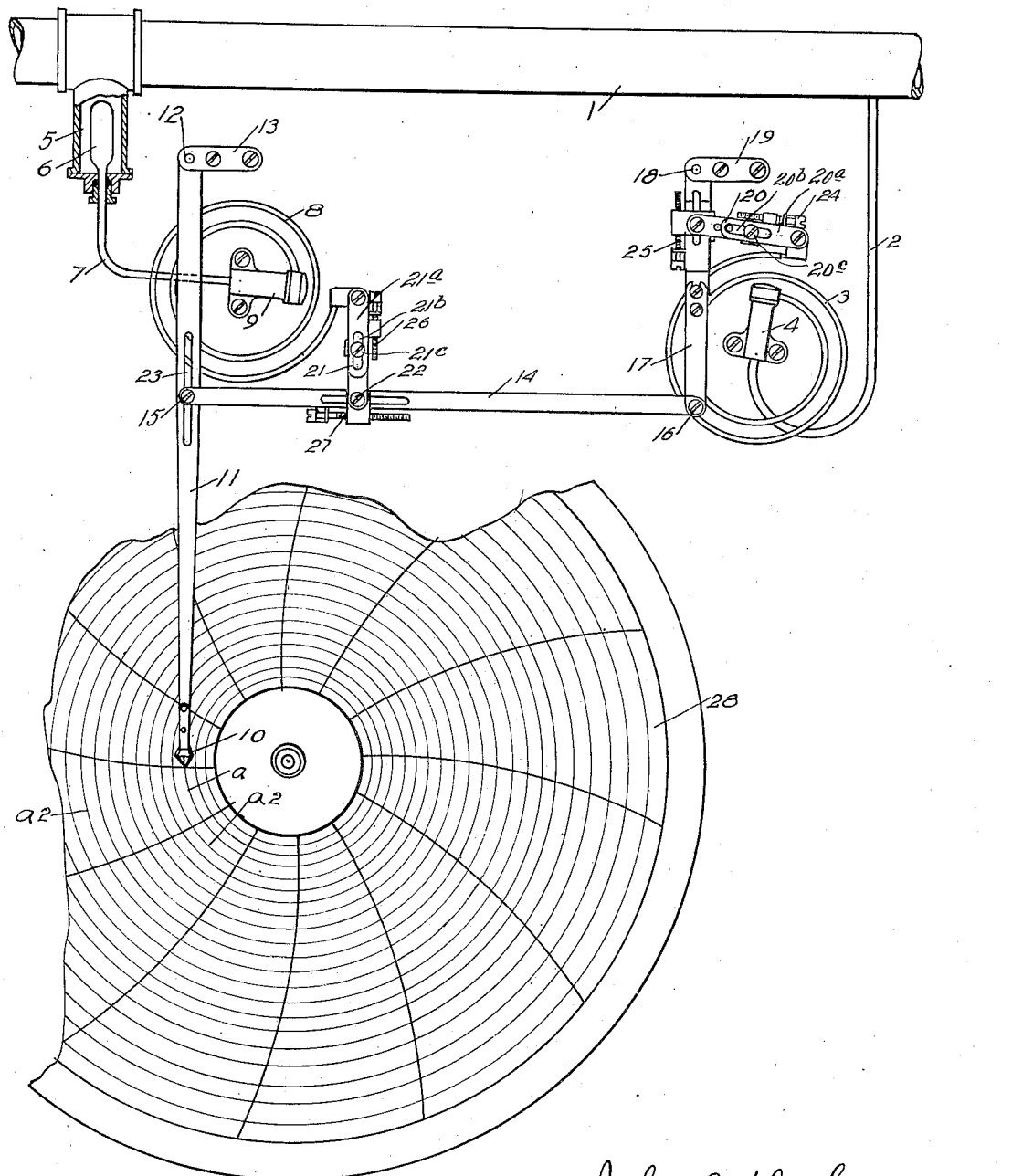
John C. Diehl
INVENTOR.
BY
ATTORNEYS.

Patented Jan. 26, 1937

2,068,663

UNITED STATES PATENT OFFICE 2,068,663

INDICATOR FOR FLUID VARIABLES

John C. Diehl, Erie, Pa., assignor to American Meter Company, New York, N. Y., a corporation of Delaware Application January 3, 1931, Serial No. 506,397

3 Claims. (Cl. 73—31)

It is often desirable to indicate a number of variables in fluids in order that these variables may be considered with relation to the fluid. As exemplified the present invention is designed to indicate the pressure and temperature of a fluid, such as gas, so that the measurement of that fluid may be more accurately determined. In carrying out the invention I have provided a means whereby a plurality of variables, as for instance, pressure and temperature may be manifest with a single indicator, or recorder, so that a single reading will indicate the modifications in the conditions of the fluid which conditions are of importance in computing the flow. Thus the pressure, of course, varies the actual quantity of gas for each foot and in like manner, temperature also varies the quantity of gas in each measuring foot and the present invention establishes a factor which may be used in determining the actual flow in standard units. Features and details of the invention will appear from the specification and claims.

A preferred embodiment of the invention is illustrated in the accompanying drawing wherein the structure is shown in a single elevation, partly in section.

1 marks a fluid conduit, as for instance, a gas line. A pressure tube 2 is carried from this line and connected with a Bourdon tube, or pressure spring 3, the pressure spring being mounted on a fixed support 4. A well 5 is also arranged in the line and a bulb 6 is placed in this well and connected by a tube 7 with a Bourdon tube, or spring 8, responding to the pressures induced by the changes in temperature. The tube 8 has its fixed end mounted in a stationary fitting 9.

A pen 10 is carried by a lever, or arm 11. This lever is pivotally mounted at 12 on a stationary bracket 13. A link 14 is connected by a pin 15 with the lever 11 and by a pin 16 with a lever 17. This is pivoted on a pin 18, on a bracket 19. The lever 17 is pivotally connected by a link 20 with the free end of the tube 3 and consequently is moved by the tube in response to changes in pressure. As the pressure in the tube 3 increases in accordance with the pressure in the conduit, the free end moves to the left, or counter-clockwise with an increase of pressure and toward the right, or clock-wise with a decrease of pressure and this movement is conveyed through the lever 17, link 14 to the lever 11 and finally to the pen 10.

This movement in response to pressure is modified, however, by variations in temperature. A link 21 is secured by an arm to the free end of the tube 8 and by a pin 22 with the link 14. The pin 15 is secured in a slot 23 in the lever 11 so that as the link 14 is moved in response to the movement of the tube 8 it moves the pin 15 along the slot 23 and consequently varies the effective lever arm actuated by the link 14. The pin 15 operating in the slot 23 forms a pivotal and sliding connection between the link 14 and the lever 11. Thus if the temperature increases the free end of the Bourdon tube 8 moves clockwise and thus moves the pivot 15 through the link 14 away from the pivot 12 so that the change of the gas through increase of temperature is indicated at the pen and modifies the position of the pen in response to pressure in the conduit 1 acting on the tube 3.

In order to make the initial adjustments the various arms and levers are adjustable. Thus a screw 24 is provided for adjusting the length of the link 20 and a screw 25 for adjusting the connection between the link 20 and the lever 17 toward and from the pivot 18, a screw 26 for adjusting the length of the link 21 and a screw 27 for adjusting the position of the pin 22 on the link 14. By means of these screws the initial adjustment of the apparatus may be accomplished and any variations in the throw of the Bourdon tubes on the linkage leading from the tubes may be varied and a respective response therefrom may be rectified. The link 20 is made in two parts, the screw 24 being anchored on one part and operating on the other part of the link. The part 20a is provided with a slot 20b, and a screw 20c extends through the complementary part of the link and locks the adjustment made by the screw 24. Similarly the link 21 is provided with two members, one part 21a having a slot 21b through which the screw 21c extends into the complementary member so as to clamp the two parts in adjusted position.

Preferably the pen 10 records its action on a chart 28.

As examples in which the device is used, let us assume that we are solving the expression $$\frac{Tv \times P}{T \times Pv}$$

in which $Tv$=base temperature, as 500° F. absolute.
$T$=any temperature affecting tube 8.
$Pv$=base pressure as 15 lbs. absolute.
$P$=any pressure affecting tube 3.

The position of rest of the point 10 on the chart 28 when pressure is 15 pounds absolute and the temperature is 500° F. is arranged at zero.

Let us assume that the pressure in the tube 3 has reached 30 pounds absolute while the temperature in the tube 8 is at 500° F. absolute (40° F.).

Under these conditions the tube 3 expands under the pressure and moves the arm 11 through the link 14 outwardly over the chart 28. The magnitude of the movement of the arm 11 is proportional to the movement of the Bourdon tube 3, times the length of the arm 11 (from the pivot point 12 to the pen point 10) divided by the distance from the pivot point 12 to the point 15. The position of rest of the point 10 under these conditions of pressure and temperature on the chart 28 is marked $a^2$, as $$\frac{500}{500} \times \frac{30}{15} = 2$$

The chart is then divided for its full scale into equal increments $a$ with the distance from 0 to 2 as a basis of measurement.

Now, let us assume an increase in temperature to 100° F. (600° absolute) with a pressure remaining at 30 pounds absolute. With the increase in temperature the Bourdon tube 8 expands and moves the link 14 and with it the pin 15 away from the lever pivot 12. The resultant movement of the point 10 is, as stated before, proportional to the movement of the tube 3 times the full length of the arm 11 divided by the distance between the point 12 and the point 15. Now since the point 15 has been moved away from the pivot 12 increasing the distance between 12 and 15, while the distance 12 to 10 remains constant, the ratio of 12 to 15 as to 12 to 10 is increased and the point 10 moves a correspondingly smaller amount, and is equal to $$\frac{500}{600} \times \frac{30}{15} = 1\frac{2}{3}$$

Stating the matter in another way with relation to the proportions of the parts we may make the length of the lever 11 from 12 to 10 equal to 10 inches and the distance from 12 to 15 equal to 5 inches when the temperature is 500° F. absolute. Then a pressure of 30 pounds absolute will move the point 15 to the left twice as far as a pressure of 15 pounds absolute. If we assume that this movement is one inch, point 10 will move $$1'' \times \frac{10}{5} = 2''$$

Now as the temperature is increased to 600° F. absolute, the point 15 is moved downward through the action of the Bourdon tube 8 on the link 14 so that the distance from 12 to 15 is increased to 6". Then with the same pressure of 30 pounds absolute the point 10 moves $$1'' \times \frac{10}{6} = 1\frac{2}{3}'' \quad \left(\frac{500}{600} \times \frac{30}{15} = 1\frac{2}{3}\right)$$

The arm 11 is related to the chart so that with the lever at the zero position, the slot 23 is substantially tangent to the arc traversed by the link 14 with the temperature at zero position so that a movement of the link is accomplished independently of substantial movement of the link in this position. In other positions of the indicating arm, the movement of the link corrects the position of the arm with relation to the position of the modifying element 8.

What I claim as new is:—

1. Measuring apparatus of the character set forth comprising a pressure responsive element; an arm angularly movable thereby; a pivotal mounting; an oscillatable arm secured to the mounting and including a portion provided with a slot; a link pivoted to the pressure responsive arm; a pin fixed to the link and connecting it with the oscillatable arm through its slot for movement in the latter; a temperature responsive element; an arm angularly movable thereby; a second link connecting the temperature responsive element arm with the first named link whereby movement of said temperature responsive element will move the first named link independently of the pressure responsive arm to displace the point of action to the pressure responsive element on the oscillatable arm.

2. In a measuring apparatus of the character set forth comprising a device responsive to one fluid condition; a mechanism responsive to a second fluid condition of the same fluid; an oscillatable arm; a pivotal mounting for said arm; a linkage connecting the mechanism with the arm, said linkage comprising a rigid member extending from the arm in a direction at substantially right angles thereto; a variable connection between the arm and member; means actuated by the device operating on the rigid member to move it along the arm to vary the connection between the member and the arm, said device varying said connection independently of substantial adjustment of the arm, said means being adjustable along the member to vary the degree of movement of the arm relatively to the movement of the device.

3. In a measuring apparatus of the character set forth comprising a pressure responsive element; an arm angularly movable thereby; an oscillatable arm; a pivotal mounting for the oscillatable arm; a link pivoted to the pressure responsive arm and slidingly and pivotally connected with the oscillatable arm; a temperature responsive element; a member movable angularly with relation to the link by the temperature responsive element; and a connection between the member and said link whereby movement of said temperature responsive element will move the said link independently of substantial adjustment of the oscillatory arm.

JOHN C. DIEHL.